March 25, 1941. F. C. BEST 2,235,975
TRANSMISSION CONTROL
Filed June 24, 1938 2 Sheets-Sheet 2
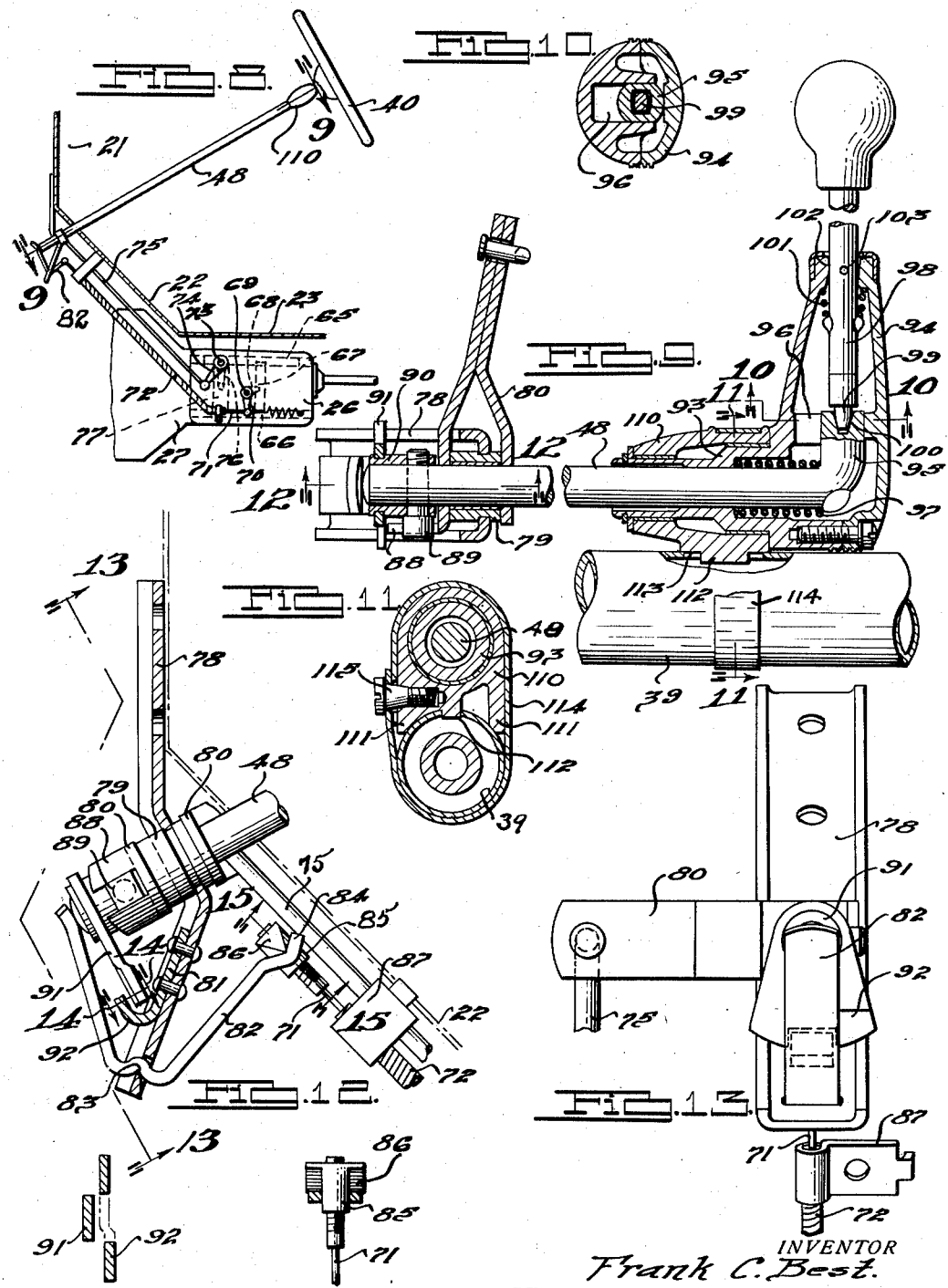
INVENTOR
Frank C. Best.
BY
Schetts & Hart
ATTORNEYS.

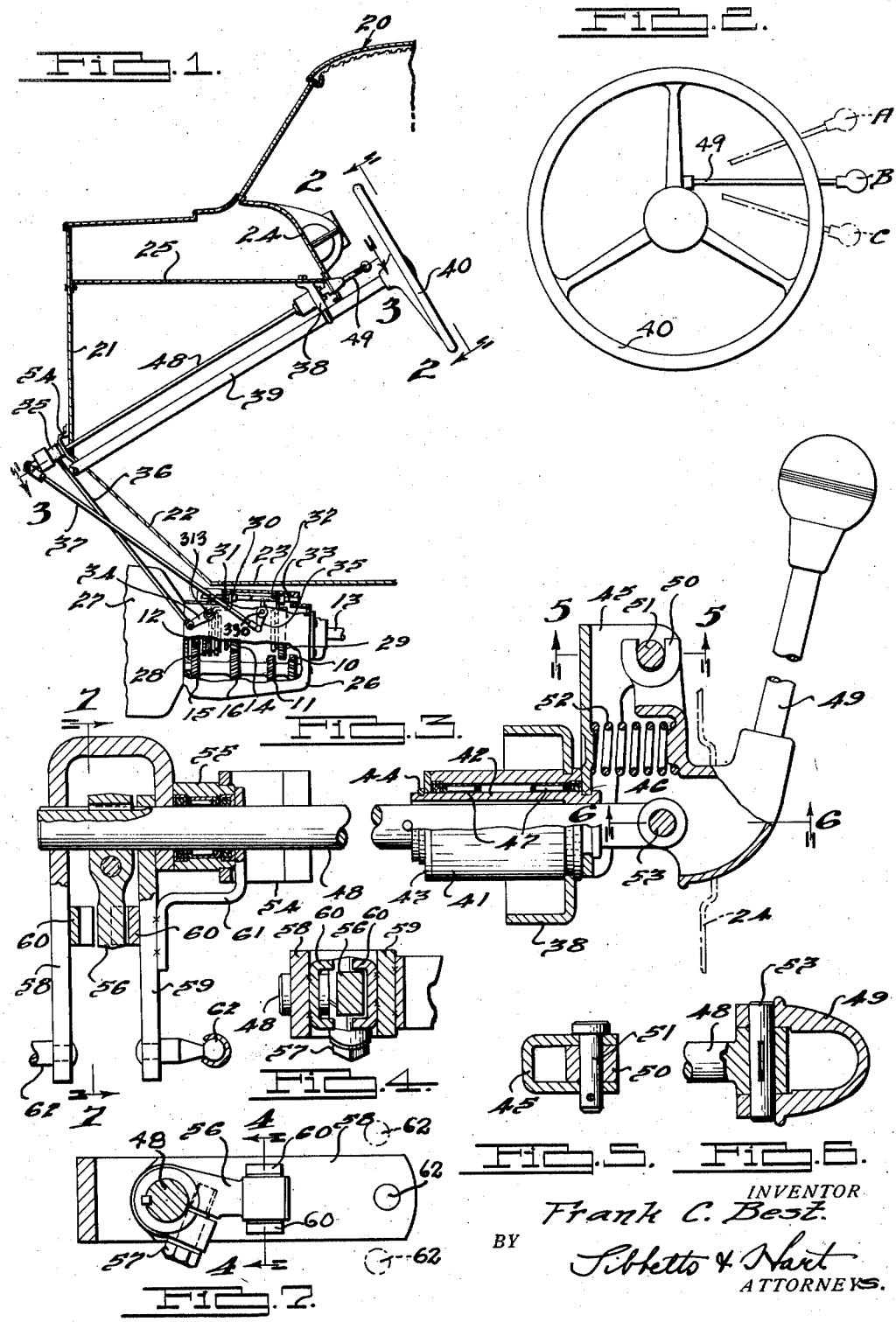

Patented Mar. 25, 1941

2,235,975

UNITED STATES PATENT OFFICE 2,235,975

TRANSMISSION CONTROL

Frank C. Best, Detroit, Mich., assignor to Packard Motor Car Company, Detroit, Mich., a corporation of Michigan Application June 24, 1938, Serial No. 215,572

5 Claims. (Cl. 74—473)

This invention relates to motor vehicles and more particularly to control mechanism for change speed drive gearing.

An object of the invention is to provide mechanism for controlling the change speed gearing that is arranged in a manner such that it will not interfere with the comfort of the vehicle occupants.

Another object of the invention is to provide a simplified form of remote control mechanism for change speed drive mechanism of a motor vehicle that can be operated from a point adjacent the steering wheel.

A further object of the invention is to provide gear changing mechanism that can be actuated by the driver of a motor vehicle with minimum effort.

Other objects of the invention will appear from the following description taken in connection with the drawings, which form a part of this specification, and in which:

Fig. 1 is a fragmentary vertical sectional view of a forward end of a motor vehicle body showing the invention associated therewith;

Fig. 2 is a plan view of the steering wheel and the gear shift control lever in some of its positions of adjustment, taken on line 2—2 of Fig. 1;

Fig. 3 is a sectional view of the control mechanism taken on line 3—3 of Fig. 1;

Fig. 4 is a sectional view taken on line 4—4 of of Fig. 7;

Fig. 5 is a sectional view taken on line 5—5 of Fig. 3;

Fig. 6 is a sectional view taken on line 6—6 of Fig. 3;

Fig. 7 is a sectional view taken on line 7—7 of Fig. 3;

Fig. 8 is a sectional view of the forward portion of a motor vehicle showing a modified form of the invention;

Fig. 9 is a sectional view of the modified form of the invention taken on line 9—9 of Fig. 8;

Fig. 10 is a sectional view taken on line 10—10 of Fig. 9;

Fig. 11 is a sectional view taken on line 11—11 of Fig. 9;

Fig. 12 is a sectional view taken on line 12—12 of Fig. 9;

Fig. 13 is a sectional view taken on line 13—13 of Fig. 12;

Fig. 14 is a sectional view taken on line 14—14 of Fig. 13;

Fig. 15 is a sectional view taken on line 15—15 of Fig. 12.

Referring now to the form of the invention shown in Figs. 1 to 7 inclusive, the forward end of the motor vehicle body includes the usual dash 21, toe board 22, floor 23, and instrument board 24. Extending between and secured to the dash and the instrument board is a channel-shaped brace member 25.

Beneath the body floor is a power unit of conventional design having a change speed drive gear mechanism contained within a casing 26, and in advance of such casing is the clutch casing 27. Within the gear casing is a conventional three forward speed and reverse gearing, the first and second forward speeds being established by the shifting of the clutch member 28, and the low forward speed and reverse drive being established by shifting of the gear 29. The clutch is shifted by the usual yoke 30 mounted upon the shift rail 31 and the gear 29 is shifted by yoke 32 fixed on rail 33. Shafts 313 and 330 extend into the transmission case and have arms fixed thereon for engaging the rails and arms 34 and 35 are connected to the outer ends thereof. A rod 36 is connected to actuate the arm 34 while a rod 37 is connected to actuate the arm 35. These arms, links and shafts, together with the rails and the yokes carried by the rails constitute two mechanisms for controlling the selection of the gearing to establish the desired drive.

Associated with these two controlling mechanisms at a point outside of the body is actuator mechanism that extends to a point adjacent the instrument board within convenient reach of the driver. Bracket 38 is fixed to the brace member 25 and is clamped to the steering column 39 of the vehicle, the steering column having the usual hand wheel 40 mounted at the upper end thereof. Fixed to the bracket is a collar 41 through which a sleeve 42 extends. The end of the collar is engaged by end closure plate 43 and a split spring washer 44 lies in a recess in the bearing sleeve and engages the end plate. Associated with the other end of the bearing sleeve is a casing 45 having an annular edge 46 extending into a groove of the sleeve and fixed in such relation by a spinning operation or by some other suitable means. Between the sleeve and the collar is arranged roller bearings 47. The washer 44 and the engagement of the casing 45 with the bearing and the collar will maintain the sleeve 42 and the casing in fixed axial position.

Projecting through the sleeve 42 is a shaft 48 that carries a pin 53 on which a physically operable lever structure 49 is journalled. This lever has a bifurcated extension 50 that engages a pin 51 in the casing on which it is mounted to swivel so that the shaft 48 can be shifted axially by fore and aft movement of the lever. Between one wall of the casing and the lever, adjacent the mounting for the lever, is arranged a coil spring 52 that exerts pressure to normally hold the lever in a relation such that shaft 48 will be engaged to actuate the control mechanism of which the clutch 28 forms a part. The instrument board is suitably perforated to allow the hand lever to project therethrough and the casing 45 and its supporting bracket structure is located close to and in advance of the instrument board. The casing 45 is mounted so that it can be rotated in a direction about the axis of the shaft 48 because of the rotatable relation of the carrier sleeve 42 with the collar 41 that is fixed to the bracket 38, and such movement of the lever will carry the casing and shaft therewith. Fore and aft movement of the lever will move the shaft 48 axially through means of the pin connection 53.

Fixed to the forward end of the body is a bracket 54 to which a sleeve 55 is fixed. The shaft 48 extends through such bracket and sleeve and has splined on its lower end a selector element 56. This selector element is formed with a bifurcated end and associated with such end is a bolt 57 that can be tightened to lock the selector in desired splined axial relation on the shaft to regulate the axial movement of the shaft with respect to the two control mechanisms.

A pair of arms 58 and 59, arranged in spaced relation, are rotatably mounted on shaft 48 and they each have welded thereto a member 60 having a recess for receiving the selector 56 when the shaft 48 is moved axially. When the selector engages in either recess a driving connection is established between the shaft 48 and the associated actuating mechanism for shifting operation. The arm 58 is provided with a U-shaped end that the shaft 48 passes through and the arm 59 is arranged inside of the bent end of the arm 58. Welded to the arm 59 is an angular bracket member 61 through one end of which the shaft 48 extends, this end of the bracket member lying adjacent the upper end of the sleeve 55. The arrangement of the arms 59 and 61 will prevent axial movement of the arms 58 and 59 in either direction, and when the shaft 48 is shifted to drivingly engage either of the elements 60, then the selector will be clear of the other of such elements and the selected arms 58 or 59 can be rotated with the shaft 48. A suitable ball ended connector 62 is fixed to each arm 58 and 59 and the rod 37 is connected to the connector on arm 58 while the rod 36 is connected to the connector on arm 59. Rotation of the shaft 48 will rock the arms 58 and 59, depending upon which one is selected by the axial movement of the shaft about the axis of shaft 48, whereupon the selected rod 36 or 37 will be moved axially and will rock the associated arm 34 or 35 and the shaft fixed thereto to thus cause shifting of the clutch 28 or gear 29 as may be desired.

As previously stated, the shaft 48 is moved downwardly by pulling the lever 49 toward the driver to thus engage the selector 56 in driving relation with the arm 58, and when such driving relation is established the lever structure can be swung from its neutral position B to its uppermost position, as shown at A in Fig. 2, to cause rotation of the shaft 48 and the arm 58 in a direction to move the gear 29 rearwardly into mesh with idler 10 to establish reverse driving relation of the gearing. When the lever structure is in the lowermost position, as shown at C in Fig. 2, then the gear 29 will be moved to the right engaging the gear 29 with gear 11 to establish first speed forward drive. The lever 49 is moved to its foremost position by spring 52 where the selector is in engagement with the arm 59 and this lever can then be swung to shift the rod 36 to the left, as shown at A in Fig. 2, to thereby move the clutch 28 forwardly to engage drive gear 12 with the driven shaft 13 establishing high speed driving relation. When the arm 59 is drivingly engaged by the selector then movement of lever 49 to the right, as shown at C in Fig. 2, will move the clutch 28 to engage loose gear 14 with shaft 13 and this loose gear being driven by gears 12, 15 and 16 will drive the driven shaft at second forward speed.

The modified form of the invention shown in Figs. 8 to 15 inclusive is similar in many respects to the mechanism previously described. In this form of the invention the body elements are indicated by the same numerals previously used and the gear power unit is indicated generally by the same numerals. In this gear casing there are two vertically spaced shift rods, as indicated at 65 and 66, that are arranged to have a vertically slidable latch element 67 extending therebetween and actuated by an arm 68 on a shaft 69 extending into the gear case. On the outer end of this shaft is an arm 70 to which a wire 71 is fixed, the wire being surrounded by a flexible housing 72 over the greater portion of its length. Another shaft 73 extends into the gear casing and has an arm 74 fixed thereto externally of the gear case that connects with a link 75. On the inside of the gear case this shaft 73 carries an arm 76 pivoted to a bar 77 having bifurcated ends engaging with bosses on the two shifter rods whereby the latched rod acts as a fulcrum for the shifter bar 77 when the shift mechanism is actuated. This form of gearing, selector and shifting mechanism is described in detail in application Serial No. 215,571, filed concurrently herewith.

Closely adjacent the steering column 39 extends an actuator shaft 48 of a character similar to that in the previously described form of the invention. This shaft 48 extends through the floor board and through a bracket 78 that is fixed to and depends from the dash. This bracket serves a plurality of purposes. It carries bushing 79 that locates the shaft 48 and acts as a spacer for the two sections of an arm 80. It carries a lock-out element 81 and serves as a fulcrum for the bell crank 82. The bell crank consists of a strip of metal bent to form two arms having therebetween a fulcrum portion 83. One of the arms is arranged adjacent the lower end of the shaft 48 and the end 84 of the other arm is bifurcated and curved to receive knife bearing sections 85 of a connector member 86 to which the wire 71 is adjustably attached. Suitable brackets, as indicated at 87, are provided on the toe board and the gear casing and guide the flexible casing 72 so that the wire will function to rock the arm 70 upon movement of the bell crank 82 by the axial movement of the shaft 48. One of the arms 80 is provided with a slotted extension 88 for the reception of the square head of a bolt 89 having its shank passing through the shaft 48. Such bolt also fixes a sleeve 90 to the shaft 48. Fixed on this sleeve 90 is an arm 91 arranged to cooperate with an upturned slotted flanged portion 92 of the lock-out element 81. The slot in this flange is arranged so that the arm 91 can pass therethrough when the shaft 48 is shifted axially, and after the shaft is rotated from such shifting position then the flange will prevent axial movement of the arm and consequently of the shaft 48. Rotation of the shaft will move the arm 80 therewith to move the link 75 in an axial direction to rock the arm 74 and shift the selected rail. Movement of the shaft 48 in an axial direction will pivot the bell crank to move the wire 71 in an axial direction so that it will rock the arm 70 and latch the rail that is not to be shifted, the latched rail acting as a fulcrum for the actuator 77 in shifting the unlatched shifter rail.

This axial and rotational movement of the shaft 48 results from the physical operation of mechanism located adjacent the steering wheel 40. The upper end of the rod 48 extends into an annular casing 93 and has a lateral extension 94 at its end. The upper end of the rod 48 extends into the lateral casing extension 94 and through a guide opening 96 formed by flanges in the extension to limit the axial movement and prevent rotational movement of the rod relative to the casing. The rod is normally held in one extreme position of its axial movement by a coil spring 97 that surrounds the rod and bears against the bent end of the rod at one of its ends and against the casing at the other of its ends.

Projecting into the casing extension is a lever 98 provided at its inner end with a driving portion 99 engaging a socket 100 in the end of the shaft 39. In the casing extension is a coil spring 101 surrounding this lever and engaging the lever in the casing to normally hold the lever in driving engagement with the shaft 48. The mouth 102 of the casing into which the lever extends carries a pin 103 on which the lever is fulcrumed so that it can be moved fore and aft of the vehicle without moving the casing but so that rotational movement thereof will be transmitted to the casing 94 and the shaft 48 extending therein.

By rocking the lever 98 fore and aft, the shaft 48 will be shifted axially to rock the bell crank 82 and thereby shift the selector element 67 while movement of the lever 98 in a lateral direction will cause the shaft 48 to rotate about its axis causing the head 89 to rotate arm 80 and operate the link 75 to rock the arm 74 and shaft 73 to cause the shifter element 77 to shift the unlatched rod.

The casing 93 is preferably attached to the steering column 39 in front of and adjacent the steering wheel 40. A portion of the casing 93 is telescoped by an annular bracket 110 having a pair of arms 111 that bear against the column 39 and a tongue 112 that extends into a slot 113 in the column. Securing the bracket 110 to the column is a strap 114 that extends around the bracket and the column and has its ends fixed to the bracket by a screw 115. The slot 113 in the column is longer than the tongue 112 to permit a small amount of adjustment of the securing means for the shaft 48 in an axial direction, but the tongue is associated with the slot to prevent rotation of the bracket 110. The casing 93 is rotatably mounted in the bracket 110 and the shaft 48 is axially movable in the casing.

The lever 98 in the modified form of the invention is movable in substantially the same manner to establish the same drives as the lever 49 in the other form of the invention. When lever 98 is rocked toward the driver in a direction longitudinally of the vehicle, then the shaft 48 will be moved downwardly in an axial direction and will rock the bell crank 82 and move the cable 71 forwardly thereby rocking the arm 70 forwardly and rotating the shaft 69 in a direction to move the selector element 67 downwardly thus latching the lower shift rail 66. Such movement of the shaft 48 will cause the arm 91 to pass through the slot in the gate 92 and rotation of the shaft 48 after the lock arm has passed through the slot in the lock-out gate will maintain the shaft 48 in its lower axial position whereby the lower rail 66 will be locked and the upper rail can then be shifted forwardly or rearwardly to establish first and second speeds. Rocking of the lever 98 toward the left will shift the link 75 and rotate the arm 74 and the shaft 93 in a direction moving the rail 65 forwardly to establish direct drive, and rocking of the lever 98 to the right of neutral position will move the link 75 downwardly shifting the rail 65 rearwardly to establish second speed. When the shaft 48 is moved and held in its outermost axial position by spring 97 then the arm 91 will lie above the gate 92 and the bell crank will be in a position holding the cable 71 in a position such that the selector 68 will engage and latch the upper rail. Upon rotation of the shaft 48, the link 75 will be shifted to move the lower rail 66 either forwardly or rearwardly. When the lower rail is shifted forwardly it will establish high speed forward drive through the gearing and when it is shifted rearwardly it will establish second speed forward drive through the gearing.

Although the invention has been described in connection with specific embodiments, the principles involved are susceptible of numerous other applications which will readily occur to persons skilled in the art. The invention is therefore to be limited only as indicated by the scope of the appended claims.

What is claimed is:

1. In a change speed gear mechanism having a pair of control mechanisms, actuator mechanism for said control mechanisms comprising a rotatably mounted annular casing with a lateral extension at one end, said casing being fixed in an axial direction, a shaft mounted in said casing and movable axially and rotationally and having a bent end projecting into the casing extension, said control mechanisms being selected and actuated by axial and rotational movements of said shaft, a lever extending into the casing extension and mounted for rocking movement, the end of said lever in the casing drivingly engaging the bent end of said shaft, said casing extension limiting the axial movement of said shaft, a coil spring engaging the casing at one end and the bent end of the shaft at the other end for normally urging said shaft toward one extreme position of axial movement, and a coil spring in said casing urging said lever in the direction establishing its driving relation with said shaft end.

2. In a change speed gear mechanism for motor vehicles having a pair of gear control mechanisms, actuator mechanism for said control mechanisms comprising a shaft, a pair of fixed carrier members, bearing members for the shaft rotatably mounted in the carrier members but fixed against axial movement, a lever operable to move said shaft about its axis and in an axial direction, a pivoted arm connected to a first of the control mechanisms and held against axial movement by one of said bearing members, a driving connection between the arm and the shaft, said connection allowing axial movement of the shaft relative to the arm, and a connection responsive to axial movement of the shaft for operating the second gear control mechanism.

3. In a change speed gear mechanism for motor vehicles having a pair of gear control mechanisms, actuator mechanism for said control mechanisms comprising a bracket fixed to the vehicle, a lock-out member fixed on said bracket, a bell crank fulcrumed on said bracket, a bearing on said bracket, a shaft extending through the bearing and movable in an axial direction and in a direction about its axis, the shaft being arranged to rock said bell crank upon axial movement, a connection between the bell crank and a first gear control mechanism, a connection between the shaft and the second gear control mechanism responsive to rotative movement of the shaft, and an arm carried by said shaft adapted to cooperate with said lock-out member to retain the shaft in either one of two axial positions.

4. In a change speed gear mechanism for motor vehicles having gear control mechanism, actuator mechanism for said control mechanism comprising a casing rotatably mounted but fixed against axial movement, guide means in said casing, a shaft mounted in the casing and having one end extending into the guide means, said guide means allowing limited axial movement and preventing rotative movement of said shaft relative to said casing, said shaft being connected to actuate the gear control mechanism, a lever pivoted to the end of the shaft in the casing guide means, and pivot means in the casing for the lever at a point spaced from the pivotal connection with the shaft.

5. In a change speed gear mechanism for motor vehicles having gear control mechanism, actuator mechanism for said control mechanism comprising a shaft movable axially and about its axis, connections between the shaft and the gear control mechanism responsive to axial or rotative movements of the shaft, an arm fixed to an end of the shaft, and fixed means cooperating with said arm to maintain said shaft in either one of two axial positions, said means including a recess through which said arm can move when the shaft is in one position of its rotative adjustment.

FRANK C. BEST.